June 28, 1960 E. WILDHABER 2,942,491
HYPOID GEARING

Filed May 8, 1958 3 Sheets-Sheet 1

INVENTOR:
Ernest Wildhaber

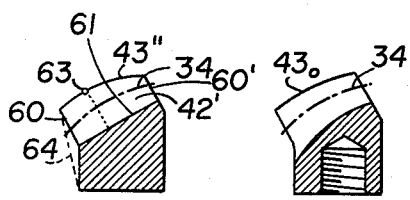
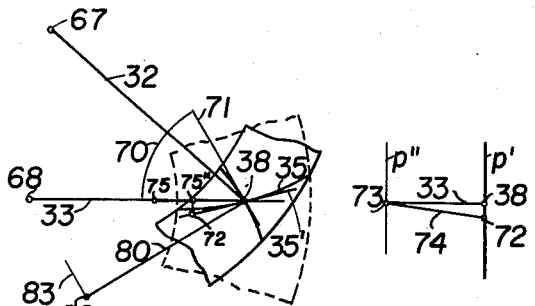
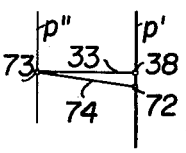
FIG.6  FIG.7  FIG.8  FIG.9
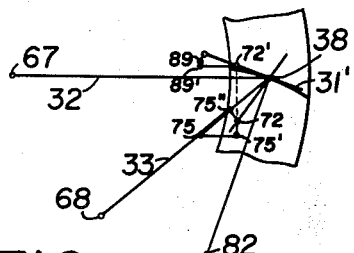
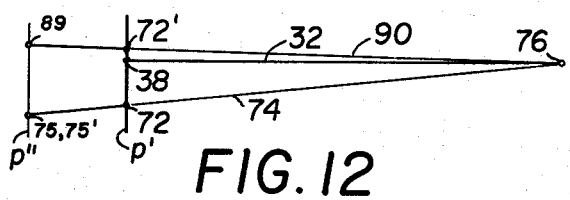
FIG.11  FIG.12
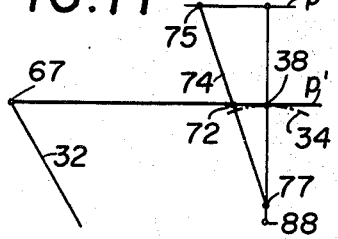
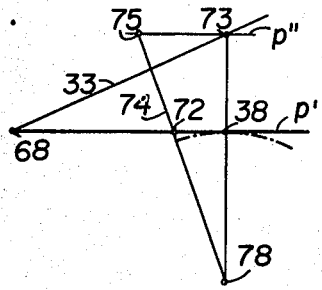
FIG.13  FIG.10
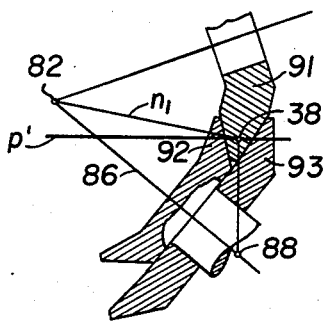
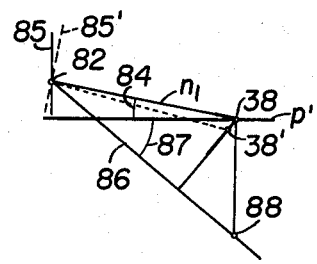
FIG.15  FIG.14
INVENTOR:
Ernest Wildhaber

United States Patent Office 2,942,491
Patented June 28, 1960

2,942,491

HYPOID GEARING

Ernest Wildhaber, Brighton, N.Y.
(124 Summit Drive, Rochester 20, N.Y.)

Filed May 8, 1958, Ser. No. 733,990

16 Claims. (Cl. 74—459.5)

The present invention relates to hypoid gearing comprising a gear and a mating pinion having angularly disposed and offset axes, where the pinion has spirally arranged teeth adapted for successive engagement along their length.

One object of the invention is to devise a novel tooth shape that has an increased load capacity. A further object is to devise a hypoid gear pair capable of carrying the same load as a conventional hypoid gear pair of increased size, and a gear pair whose face width can be decreased without loss of comparative load capacity.

A further aim is to devise a tooth shape having more pitch line contact under otherwise equal conditions, so that more teeth are in simultaneous contact and the load per tooth is decreased; and to devise hypoid gearing operating very quietly because of the increased number of teeth in simultaneous contact. A further object is to provide hypoid gearing of this character with intimate tooth contact.

Also advantages shall be secured by providing teeth on the gear, or larger member of the gear pair, that have different curvatures on opposite sides in plane sections taken lengthwise of the teeth, and where the longitudinally convex side of the gear teeth is distinctly more curved lengthwise than the longitudinally concave side. A related aim is to provide teeth having approximately equal pitch lines on opposite sides in pitch surfaces that have a convex axial profile on the gear, and teeth whose tops lie in a surface of revolution of convex axial profile, of convex profile in an axial section.

A still other object is to provide a pair of hypoid gears having pitch surfaces that contact each other along a helix of constant lead, and where this helix has an axis coinciding with the axis of a basic member of the gear pair. The term basic member is further described hereafter. This invention relates in general to the same type of gearing disclosed in my pending application entitled "Gearing," filed November 1, 1955, Serial No. 544,270.

These objects may be attained singly or in any combination.

In the drawings:

Fig. 1 is a view taken in the direction of the gear axis, while Fig. 2 is taken in the direction of the center line 41 of the gear pair.

Figures 6 and 7 are fragmentary axial sections of hypoid gears showing different sectional proportions.

Figure 1:
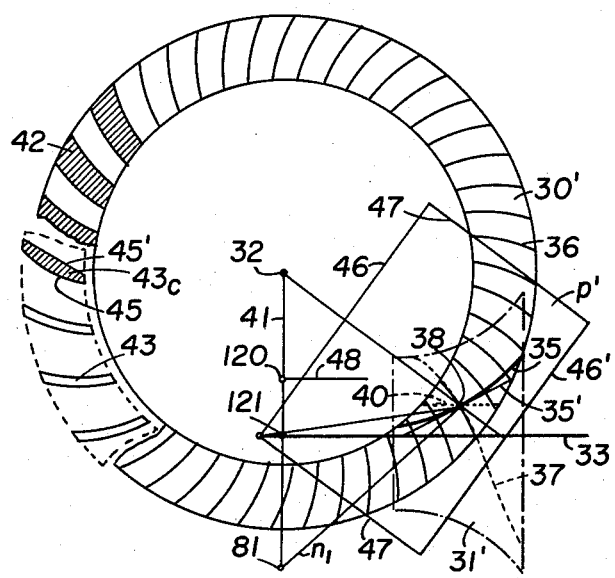
Figures 1 and 2 are corresponding diagrammatic views explanatory of the principles underlying the present invention and showing principally the pitch surfaces and pitch lines of a pair of hypoid gears constructed according to the present invention.
Figure 2:
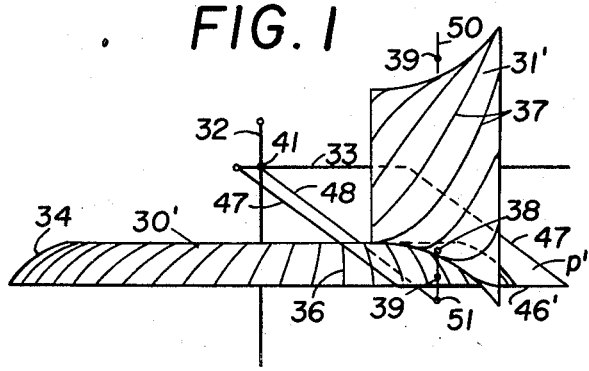

Fig. 8 is a view and diagram of plane $p'$ also shown in Figures 1 and 2. This plane is the tangent plane at a mean point 38 of the contacting pitch surfaces. It will be referred to as the pitch plane.

Fig. 9 is a diagram viewing the pitch $p'$ from right to left in Fig. 8.

Fig. 10 is a similar diagram viewing the pitch plane from below in Fig. 8, and showing also the pinion axis.

Figures 8 to 10 are diagrams for constructing the profile curvature of the pinion pitch-surface from the given direction of the path of contact.

Figures 11 to 13 similarly refer to the profile curvature of the pitch surface of the gear. Fig. 11 is a view of the pitch plane $p'$, turned as compared with the view of Fig. 8. Fig. 12 is a diagrammatic side view, looking from right to left in Fig. 11. Fig. 13 is a bottom view corresponding to Fig. 11.

Fig. 14 is a diagrammatic normal section, taken along lines 38—82 of Fig. 8 and Fig. 11, and a diagram explanatory of design proportions.

Figure 5:
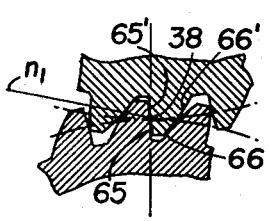
Fig. 5 is a normal section similar to Fig. 4 through a modified embodiment also corresponding to Figures 1 and 2.

Fig. 15 is a normal section like Fig. 14, showing also milling cutters for describing tooth sides of the gear and for generating mating tooth sides on the pinion, in accordance with an embodiment also corresponding to Fig. 5.

Figure 16:
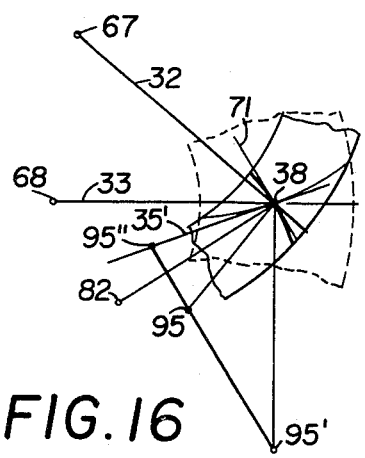

Fig. 16 is a view of the pitch plane $p'$, similar to Fig. 8, and a diagram referring to the preferred embodiments of the invention.

Figure 17:
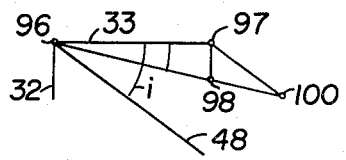

Fig. 17 is a diagram of angular velocities for determining the sought basic helical member with the information supplied by Fig. 16. This diagram applies when the axes of the hypoid-gear pair are at right angles.

Figure 18:
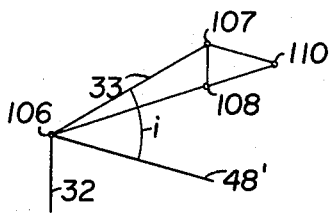

Fig. 18 is a diagram similar to Fig. 17, but applying when the axes of the gear pair are at other than right angles.

Figure 19:
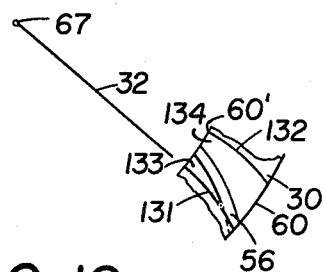

Fig. 19 is a fragmentary view of the pitch plane, showing a single tooth space of a hypoid gear constructed according to a preferred embodiment of the invention.

Figures 20, 21:
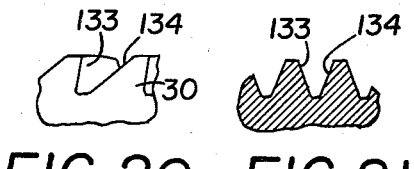

Fig. 20 is a fragmentary end view of the teeth of this gear, looking from the outside towards the gear center.

Fig. 21 is a peripheral section taken through the same teeth adjacent their inner end, also looking towards the gear center.

Figure 22:
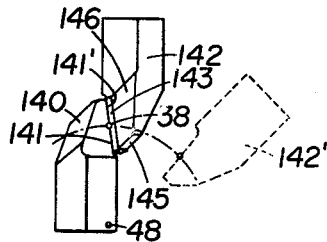

Fig. 22 is a view of a pair of tools with counterpart cutting edges, for finishing mating tooth surfaces of the gear and pinion respectively, looking in the direction of the axis 48 of the helical path of the tools. The gear-cutting tool is shown also in a further position along said path, in dotted lines.

Figure 23:
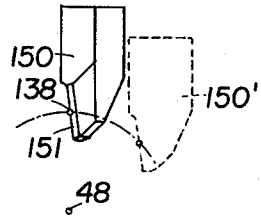

Fig. 23 is a similar view illustrating a modified tool motion. It shows a gear-cutting tool in a central position, and in dotted lines in a further position of its helical path.

In Figures 1 and 2 the gear is indicated by its pitch surface 30', and the pinion by its pitch surface 31'. They have angularly disposed and offset axes 32 and 33 respectively, which are at right angles to one another in this example. The pitch surfaces 30', 31' are surfaces of revolution about the gear axis 32 and the pinion axis 33 respectively.

It should be noted that the gear pitch surface 30' (Fig. 2) has a convex contour 34 and a convex profile (34) in an axial section. The two pitch surfaces 30', 31' contact along a line 35. The tooth surfaces of the gear and pinion extend along pitch lines 36, 37. Mating pitch lines contact at a point of line 35. The pitch lines are so determined as to have the same direction at that point. In other words the pitch lines extend in the direction of relative sliding at the point where they cross line 35, which is also the mean path of contact of the gear pair. Mean point 38 is one such crossing point.

As the gears turn, this crossing point moves along path 35, while the contacting pitch lines 36, 37 always extend in the changing direction of relative sliding at the crossing point.

How to determine pitch lines 36, 37 and to produce teeth extending along them will be shown hereafter. It will also be shown how the direction of path 35 requires a convex profile 34 on the gear pitch surface.

In conventional hypoid gears the mean path of contact extends approximately in the direction of dotted line 40, which lies in a plane parallel to the axes 32, 33 and perpendicular to the center line 41. As known, the center line 41 intersects both axes 32, 33 at right angles and is the shortest connecting line between the offset axes 32, 33.

Fig. 1 shows that more pitch lines 36 intersect path 35 than path 40 in anyone turning position, and that more tooth surfaces are in simultaneous contact at the pitch surfaces.

Some of the gear teeth are shown in section at 42 in Fig. 1, the section being taken along the convex pitch surface 30'. Like the pitch surface, the outside surface of the gear teeth is also convex. Preferably the tooth tops 43 lie in a common surface of revolution about the gear axis 32. This outside surface has a convex profile in an axial section, shown at 43' in Fig. 3, at 43" in Fig. 6, and at $43_0$ in Fig. 7.

Figure 3:
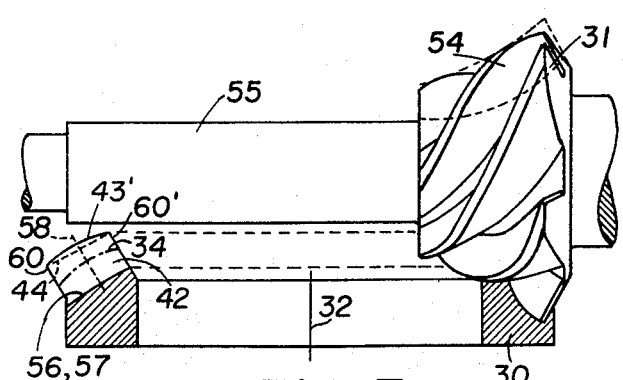
Fig. 3 is a view taken along the center line 41 of a hypoid-gear pair corresponding to Figures 1 and 2, the gear being shown in an axial section.

A few of the tooth tops are shown in Fig. 1. Their opposite sides appear about equally curved. But if a conical section, along dotted line 44 of Fig. 3, is laid through the tooth tops of opposite ends, the top section looks as shown at $43_0$ in Fig. 1. Convex side 45 is distinctly more curved than the opposite side 45'.

The pitch plane p' is the tangent plane of the contacting pitch surfaces at mean point 38. It is shown by its traces 46, 46' in planes perpendicular to the gear axis 32, and by end lines 47 perpendicular to said traces. Trace 46 lies in a plane containing the pinion axis 33. Trace 46' lies in the plane containing the lower end of the gear pitch surface.

In the preferred embodiments of the invention the mean path of contact 35 is a helix of constant lead. It extends about an axis 48 inclined to the directions of both the gear axis 32 and the pinion axis 33 (Fig. 2). Axis 48 intersects the center line 41 at least approximately, and coincides approximately with the axis of a basic helical member of the hypoid gear pair, further referred to hereafter. It intersects the mean plane of rotation 50 (Fig. 2) of the pinion at a point 51 beyond the outside circle of the pinion in said plane. The outside circle passes through the two diametrically opposite points 39.

When the offset between the axes 32, 33 of the gear pair is relatively large, I preferably provide a tooth shape such as can be described on the rotating gear and pinion by a pair of complementary lines, straight or curved, moving in a helical path together with a basic helical member of the hypoid gear pair. In this describing motion the gear and pinion turn on their axes at the inverse ratio of their tooth numbers, while the helical member carrying the complementary describing lines moves in proportion thereto, as further evident hereafter. This results in a twisted or warped tooth shape apparent especially on the gear or larger member of the gear pair, the member with more teeth.

Figure 4:
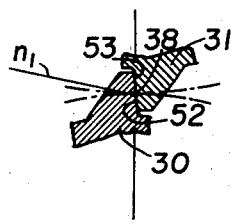
Fig. 4 is a normal section taken at mid-face through interengaging teeth, corresponding to Figures 1 to 3, the section being perpendicular to the tooth direction and to the pitch lines.

The surface of action of this gear pair is the helical surface described in space by the pair of complementary describing lines, a helical surface coaxial with and having the lead of the basic helical member used. This surface also contains the helical mean path of contact, which has the same axis and lead as the basic helical member. The pair of describing lines are preferably so directed that they lie in or are tangent to a normal sectional plane at a point adjacent the middle of the teeth. This is illustrated in Fig. 4. Here the profiles 52, 53 are complementary and coincide or approximately coincide with the pair of describing lines.

Fig. 3 shows a gear pair of this kind, comprising a gear 30 and a pinion 31, having teeth 42 and 54 respectively. In the embodiment illustrated the pinion 31 is formed integral with a projecting shaft portion 55, so that it can be rotatably mounted very rigidly on opposite sides of the gear 30.

The root surface is understood to be a surface of revolution inscribed to the tooth bottoms, 56 on the gear. This surface has an axial profile 57, or profile in an axial section, that is less curved than the profile 34 of the pitch surface, and less curved than the profile 43' of the outside surface of the gear teeth 42. This is because the said root surface comes closest to the axis 48 of the basic helical member, and because the curvature of the coaxial helices decreases with decreasing distance from this axis. It should also be noted that gear 30 has a tooth depth at the middle 58 (Fig. 3) of its face larger than the average tooth depth at opposite ends 60, 60'.

A slightly modified form of tooth section in an axial plane is shown in Fig. 6. The teeth 42' have a root surface of straight profile 61 in an axial plane, while the axial profiles 34 and 43" are convex. Unlike conventional teeth of tapering depth, but like teeth 42 of Fig. 3, the teeth 42' have their largest depth not at the outer end 60, but at a point or zone 63 between the outer end 60 and inner end 60'. Instead of the broken-line contour shown in full lines in Fig. 6, a contour along dotted line 64 may be used if desired.

Such tooth surfaces are twisted or warped from end to end of the teeth. They have a changing profile inclination. The twist increases with decreasing shaft offset, and may cause a face-width limitation at relatively small shaft offsets. To avoid it, a modified tooth shape is preferably used there.

In this modified embodiment of the invention the pitch surfaces and the helical mean path of contact are retained. Also the tooth sides of the gear and of the pinion are preferably such as can be described on the rotating gear and pinion by a pair of lines that move in a helical path across the tooth zone. However these lines are also tilted about the point of said line that moves in said helical path. They are tilted in a direction that reduces or eliminates the twist of the tooth surfaces. They may be tilted about an axis parallel to the axis of the helical path of contact.

The said pair of lines have the same direction at their intersection with the helical mean path of contact along which they move, that is at the pitch surface. But they can no longer be complementary. If the lines are embodied by a pair of cutting edges, at least one of these is concave, to produce a convex profile.

Fig. 5 shows the tooth profiles 65, 65' and 66, 66' of a mean normal section, the profiles 65, 65' contacting at mean point 38. The shown profiles are all convex; and the contacting profiles 65, 65' are curved relatively to each other. The relative curvature of the contacting normal sectional profiles in general should vary along the length of the teeth. Such variation may be achieved by applying the principles of my application entitled "Method and Means for Cutting Spiral Teeth," filed January 3, 1956, Serial No. 557,151.

This method refers to a uniform rectilinear motion of a tool relatively to a gear blank rotating at uniform velocity. During such motion the tool continuously changes its inclination to the produced surface, as it moves across the gear face. This change of inclination is made use of to produce tooth profiles of normal sections whose profile curvature varies along the length of the teeth, even though the cutting edge is constant.

An analogous change of inclination occurs with tools moved in a helical path. And an analogous procedure will produce normal tooth profiles of the required varying curvature. In a less perfect way the embodiment now being described also operates without such variation of curvature.

The pinion of a gear pair corresponding to Fig. 5 looks generally like the pinion 31 of Fig. 3, although its tooth surfaces are less twisted. An axial section of the hypoid gear may look like Fig. 7, which refers to a tapering tooth depth. Of course teeth with parallel depth may also be used.

While the use of a helical path of contact 35 is preferred other paths are also feasible. The chief characteristic is the inclination of path 35 and of its mean tangent 35'. The inclination of tangent 35' is directly related to the curvature of the pitch surfaces. This will now be described.

Curvature of pitch surfaces

The curvature at mean point 38 will be determined. The pitch plane $p'$ at this point is shown in Fig. 8. It is the tangent plane of the pitch surfaces contacting at 38. 67, 68 are the intersection points of the gear axis 32 and of the pinion axis 33, respectively, with plane $p'$. 38—67 is the projection of the gear axis 32 to pitch plane $p'$. 38—68 is the projection of the pinion axis 33 thereto. The angle 70 included between the pitch-line tangent 71 at 38 and the projected pinion axis 38—68 is called the spiral angle of the pinion. The pitch-line tangent is also the longitudinal direction of the teeth contacting at 38. According to the invention tangent 35' and the path 35 of contact itself is inclined to the longitudinal direction of the teeth at an angle larger than the spiral angle 70 of the pinion.

Let us now consider a point 72 of the path of contact 35 at an infinitesimal distance from mean point 38. This point 72 can be assumed on the tangent 35' of path 35 because of its infinitesimal distance from point 38. To show up, the distance 38—72 had to be very much exaggerated in the drawing. The pitch surfaces are surfaces of revolution and their normals intersect their respective axes. Each normal lies in an axial plane. In the side view, Fig. 9, the pitch surface normal 74 at point 72 appears in projection as a line 72—73, where 73 is the point of the pinion axis 33 that is directly above point 38 in Fig. 8, and that coincides with point 38 in projection, Fig. 8.

The direction of the pitch surface normal 74 can be defined by its intersections 72, 75 with the pitch plane $p'$ and with a plane $p''$ parallel to the pitch plane. Any suitable distance may be assumed between planes $p'$ and $p''$. In the drawings the distance between these parallel planes has been made equal to the distance 38—73 to confine the space requirement. In Fig. 8 the sought pitch surface normal 74 intersects plane $p''$ at a point 75 of line 38—68, because of the infinitesimal distance of point 72 from point 38.

The pitch surface normal 74 at point 72 also intersects the gear axis 32. Figures 11 to 13 relate to the gear pitch surface, Fig. 11 showing the pitch plane $p'$ in a suitably turned position as compared with Fig. 8. In the side view, Fig. 12, the pitch surface normal 74 appears as a line 72—76, where 76 is the point of the gear axis directly underneath point 38 in the view of the pitch plane (Fig. 11). It appears to intersect plane $p''$ at a point 75'. The actual intersection point 75 lies on a line (Fig. 11) drawn through 75' parallel to the projected gear axis 38—67. Accordingly it is at the intersection of the lines 75—75' and 75—75''. The latter coincides with the projected pinion axis. The normal 74 at point 72 is now completely defined.

To obtain the profile curvature of the gear pitch surface and the position of its curvature center 77 (Fig. 13), Fig. 11 is viewed from below, in a direction at right angles to the gear axial plane containing point 38, and the normal 74 is determined in this view. It appears to intersect the pitch surface normal 38—77 at point 77, the sought curvature center of the axial profile of the gear pitch surface.

To obtain the profile curvature of the pinion pitch surface and the location of its curvature center 78 (Fig. 10), the pitch plane $p'$, Fig. 8, is viewed from below, in a direction at right angles to the pinion axial plane containing point 38, and the normal 74 is determined in this view by projection. It appears to intersect the pitch surface normal 73—38 at the sought curvature center 78. Accordingly 38—78 is the radius of concave profile curvature of the pinion pitch surface; and 38—77 (Fig. 13) is the radius of the convex profile curvature of the gear pitch surface.

The above geometrical construction is exact for curvature radii. It can also be expressed with formulas, as readily understood by those familiar with mathematics.

Taper of pitch surfaces and lengthwise tooth curvature

The taper can be defined by the inclination of the pitch plane $p'$ to the gear axis 32 and to the pinion axis 33. How the taper should be related to the lengthwise curvature of the teeth is described in my series of eight articles on the "Basic Relationship of Hypoid Gears," published in "American Machinist" in 1946. In principle any position of the pitch plane can be used.

In the view of the pitch plane $p'$, Fig. 8, 80 denotes the normal plane at mean point 38, the plane perpendicular to the lengthwise tooth direction at 38 and perpendicular to the pitchline tangent 71. Tangent 71 extends in the direction of relative sliding at point 38. Normal plane 80 intersects the center line 41 (Fig. 1) at a point 81. On right angle drives the connecting line 38—81 is what I have called the limit normal ($n_1$). It has a special significance. It corresponds to a normal of zero pressure angle in gearing with intersecting axes. When passing through mean point 38, the profiles 52, 53 (Fig. 4), 66, 66' and 65, 65' (Fig. 5) should be equally inclined to the limit normal $n_1$ rather than to the pitch surface to effect approximately equal profile curvature.

A curvature center 82 can be determined on the limit normal $n_1$ (Fig. 8) such that a force extending through center 82 in a direction 83 perpendicular to normal plane 80 exerts turning moments on the gear and pinion in the proportion of their tooth numbers. A force extending along the limit normal $n_1$ also exerts turning moments on the gear and pinion in this same proportion. This means that any force through the curvature center 82 also fulfills the kinematic contact condition if it lies in a plane formed by the limit normal $n_1$ and perpendicular 83. This plane will be called the curvature plane.

Limit normal $n_1$ is also shown in Fig. 14, whose drawing plane is the normal plane 80. Normal $n_1$ is inclined to the pitch plane $p'$ at the limit pressure angle 84.

In current practice, which I have introduced, the gear teeth are curved lengthwise about an axis passing at least approximately through the curvature center 82, and which appears as a line 85 or 85' in the view of Fig. 14. According to the present invention the teeth are curved about an axis such as 86, that intersects the pitch plane $p'$ at an acute angle 87 smaller than sixty degrees, and that intersects the plane projected into the pitch surface normal 38—88 (Fig. 14) at a point 88. It passes between the considered tooth space and the axis 32 of the gear, see Fig. 13.

When the limit normal $n_1$ is rotated infinitesimally about axis 86, it reaches the dotted position 82—38' at one time. As the distance 38—38' is infinitesimal of the second order, being proportional to the square of the turning angle rather than directly proportional thereto, it has no influence on the curvature conditions at point 38. The curvature requirement continues to be fulfilled.

The position of curvature axis 86 only needs to be determined when the tooth surfaces of the gear or of the basic member are surfaces of revolution, or more broadly surfaces of constant profile extending about an axis at a constant distance therefrom, according to one embodiment of the invention.

The distance 38—88 is such that the lengthwise tooth curves or pitch lines lie on the pitch surface that has the determined profile curvature. Distance 38—88 equals the curvature radius of the pitch surface in a section laid through pitch surface normal 38—88 in the direction of the pitch-line tangent 71. It can be determined by considering a point 72′ (Fig. 11) that lies on the same peripheral line (shown dotted) of the gear pitch surface as point 72. Hence the lateral component 72′—89 of the projected distance of normal 90 is equal to 75′—75. The peripheral component 89′—89 can be readily determined from Fig. 12. In this view the normal 90 is the line connecting the points 72′ and 76. In Fig. 11 the sought normal 90 is the line connecting the points 72′ and 89. When this normal is viewed along the pitch plane, in a direction at right angles to pitch-line tangent 71, it appears to intersect the pitch-surface normal 38—77 at the sought point 88. Computation may be used instead of the geometrical construction.

This determination permits to obtain point 88 from the given curvature of the pitch surfaces; or also to obtain the curvature of the pitch surfaces and the inclination of the path of contact 35 from a given position of point 88.

Fig. 15 illustrates diagrammatically an embodiment in which opposite sides of a gear-tooth-space are surfaces of revolution coaxial with axis 86. They are conical surfaces. They may be described and cut for instance with a rotating milling cutter 91 that is fed about axis 86 to cut a tooth space of the gear. The teeth may have either tapering or parallel depth. With parallel depth teeth both sides of a pinion tooth may be simultaneously generated with a pair of milling cutters 92, 93 rotating on axis 86 of the gear tooth space. The cutters 92, 93 describe the sides of a tooth space of the gear as they rotate. Simultaneously a generating motion is effected between the gear represented by the cutters and the pinion being cut, as if the pinion would rotate in mesh with the gear.

Tooth ease-off or crowning can be obtained in this and all other described processes by slightly modifying the procedure, as customary in the art.

*Helical path of contact*

The two preferred embodiments both have a mean path of contact 35 that is part of a helix of constant lead, as stated. The determination of this path will now be further described. This path is about and along the axis of a basic helical member of the hypoid gear pair, at the lead of this member, exactly so for fully conjugated teeth bearing on their whole length, and approximately so when the tooth surfaces are to be eased off especially adjacent their boundaries. The exact determination for fully conjugate teeth will be particularly described, as it represents the broad principles in all cases.

Fig. 16 is a view of the pitch plane $p'$, like Fig. 8, but showing a different geometric construction. When the gear pair runs, point 38 of the pinion moves in a direction perpendicular to the projected pinion axis 33, to a point 95′ if an infinitesimal motion is infinitely enlarged. Point 38 of the gear simultaneously moves to a position 95. Point 38 of the basic helical member moves in the direction of the tangent 35′ to the helical path of contact to a position 95″. The points 95′, 95, 95″ all lie on a straight line that is parallel to the pitch-line tangent 71.

As the gear and pinion turn on their axes, a basic member moves relatively to the gear and pinion at any point in the same direction as the gear and pinion move relatively to each other. The instantaneous relative motion between a pair of hypoid gears can be considered an infinitesimal helical motion about an instantaneous axis, that is a motion about and along the instantaneous axis, where the motion along said axis has a fixed proportion or lead to the turning motion about it. The instantaneous relative motion between the basic member and the pinion is an infinitesimal helical motion about the same instantaneous axis and with the same lead. It is the same kind of motion, only its magnitude differs. Likewise the instantaneous relative motion between the basic member and the gear is an identical helical motion of different magnitude.

These instantaneous relative motions are such as to produce a relative displacement 95—95′ between the gear and pinion, a relative displacement 95″—95′ between the basic member and the pinion, and a relative displacement 95″—95 between the basic member and the gear. It can be shown that the corresponding turning motions about the instantaneous axis are also in these proportions.

Fig. 17 is a vector diagram of the angular velocities. The view is along the center line 41 of the gear pair and corresponds to Figures 2 and 3. The angular velocity about the pinion axis is represented by distance 96—97 plotted in the direction of the pinion axis. Distance 97—98 is parallel to the direction of the gear axis and represents the angular velocity about the gear axis. The proportion of the distances 96—97 and 97—98 equals the tooth ratio of the gear and pinion. 96—98 defines the direction and the amount of the angular velocity about the instantaneous axis.

The scale has been so chosen that distance 96—98 equals distance 95—95′ of Fig. 16. Distance 95″—95 is now plotted on the extended line 96—98, from 98 to 100, so that distance 98—100 (Fig. 17) equals distance 95″—95. Then 97—100 defines the direction of the axis 48 of the basic helical member that corresponds to tangent 35′, and distance 97—100 represents the angular velocity thereof at the scale of the angular velocities 96—97 and 97—98.

Fig. 17 represents the geometric construction for gear pairs with right shaft angles. Fig. 18 applies to a shaft angles other than a right angle. Line 106—107 is parallel to the pinion axis; and distance 106—107 is proportional to the angular velocity about the pinion axis. Line 107—108 is parallel to the gear axis, and distance 107—108 represents the angular velocity about the gear axis, at the same scale as used for the angular velocity of the pinion. The direction and distance 106—108 represent the direction of and the angular velocity about the instantaneous axis. The scale of Fig. 18 or the distances of Fig. 16 are so chosen that distance 106—108 equals distance 95—95′ of Fig. 16. Again distance 95″—95 is plotted on the extended line 106—108, from 108 to 110. Then 107—110 defines the direction of and the angular velocity about the axis 48′ of the sought basic helical member.

These constructions may be set up in the form of equations.

What remains to be determined are the intersection (120, Fig. 1) of the axis 48 of the basic helical member with the center line 41 of the gear pair, and the lead of the helical member.

For these reference is made to my aforesaid articles and to the named patent application. An abstract follows, using the symbols of said application:

$E$=shaft offset of gear and pinion, 32—121 in Fig. 1.
$E_x$=offset of axis 48 of basic helical member from pinion axis, =distance 120—121 in Fig. 1.
$L_x$=lead of basic helical member=axial advance per full turn, in a turning direction corresponding to helix 35.
$p$=shaft angle of gear pair, ordinarily a right angle or in Fig. 18 the angle between axes 32 and 33.

$i$=angle included between the pinion axis 33 and the axis 48 of the basic helical member, see Figs. 17 and 18.

$$E_x = \frac{1}{2}E\left[\frac{\sin p - \sin(p-2i)}{\sin p}\right]$$

$$\frac{L_x}{2\pi} = \frac{1}{2}E\left[\frac{\cos(p-2i) - \cos p}{\sin p}\right]$$

And when the shaft angle $p$ is a right angle, $p=90°$, and $E_r$ is then used for $E_x$, $L_r$ for $L_x$, the formulas become $$E_r = \frac{1}{2}E(1 - \cos 2i); \ p = 90°$$

$$\frac{L_r}{2\pi} = \frac{1}{2}E \sin 2i; \ p = 90°$$

These equations have also been expressed by a simple geometric construction in the aforesaid application.

The basic member is now completely determined. It is used in the preferred embodiments to either describe and finish cut the tooth sides of the gear and pinion, or to provide the helical mean path of contact.

Figures 19 to 21 refer to the case where the tooth sides are or can be described on the rotating gear and pinion by a pair of complementary cutting edges moving as if rigid with a helical basic member, and describing the helical surface of action of the gear pair. Fig. 19 shows a single tooth space of the gear in a view at right angles to its convex pitch surface, the drawing plane being the pitch plane $p'$. 56 denotes the bottom of the tooth space. 131 and 133 are the top edges of the opposite warped side surfaces 133, 134. The twist of the teeth surfaces is readily apparent. The wider a side surface appears in this view the more its side profile is inclined to the mean pitch-surface normal, to a line perpendicular to the drawing plane.

On the longitudinally convex side 133 the profile inclination increases from the outer end 60 to the inner end 60'. At the outer end the profile inclination may even be negative, as also shown in Fig. 20. On the longitudinally concave side 134 of the gear teeth the profile inclination decreases from the outer end 60 to the inner end 60'. At the outer end the teeth are leaning over, the profile inclination being much larger on the side 134.

How the profiles appear adjacent the inner end 60' is best shown in Fig. 21. They are almost equally inclined. They have nearly equal pressure angles.

Twisted or warped tooth surfaces are not broadly new. They were first proposed in my prior Patent No. 1,812,272, granted July 28, 1931. The present invention accomplishes an extension and increase of the tooth contact through the use on the gear of pitch surfaces of convex axial profile.

The profile inclination of opposite tooth sides, at their middle, depends on the limit pressure angle, which in turn depends on the taper of the pitch surfaces. Gear pairs which differ only in the taper of the pitch surfaces should be provided with teeth which, in the average, lean the more the flatter the gear is, the nearer the angle between the pitch plane and the gear axis comes to a right angle. The more tapered the gear, the less is the difference of the profile inclinations at mid-face.

Production

To finish cut one side of the pinion teeth, a blade 140 (Fig. 22) with a cutting edge 141 may be set to the required position with respect to the axis 48 of the basic helical member. As the pinion turns on its axis the basic member performs its corresponding helical motion about its axis 48 in engagement therewith. The tool is made to successively engage all the surfaces of one side of the pinion teeth, while performing the same helical stroke. Preferably the workpiece is rotated continuously at a uniform rate. The other side of the pinion teeth is cut in the same manner with a similar tool. The pinion teeth are roughed out previous to finish cutting.

Tool 142 may be used for finish-cutting the mating tooth sides of the gear. Its cutting edge 141' is the counterpart to cutting edge 141. The tool or blade 142 is reciprocated helically about the same axis 48 and the same lead as used on the pinion. A further tool position is shown in dotted lines 142'. The finishing tools 140, 142 preferably cut with their side edges 141, 141' only and keep a slight distance from the tooth bottom. They are preferably contour-ground. They have a relieved narrow lane 143 following the cutting edge 141' and much more relieved ends 145 and sides 146. In this way they can be kept clear of the tooth bottoms in all positions.

Modification

The other preferred tooth shape, for moderate shaft offsets, also uses a helical mean path of contact 35, but has tooth surfaces with much less twist. Fig. 23 shows diagrammatically a way of finishing one side of the gear tooth surfaces with a tool 150 whose cutting edge 151 described and finish cuts the tooth surfaces on the rotating gear, as it moves in helical strokes across the gear face. 48 is the axis of these helical strokes. As it moves about and along axis 48 the tool 150 is also tilted about the point 138 that moves in the helical path of contact. In the instance illustrated it is tilted in a direction opposite to the turn of said path through an angle equal to said turn, about an axis through 138 parallel to axis 48. Thus tool 150 performs a helical translation, and moves to positions such as position 150' shown in dotted lines. The final cutting position may be reached with a feed motion.

The relative curvature of the profiles 65, 65' and 66, 66' (Fig. 5) and the change of relative profile curvature along the teeth may be obtained from either a lengthy computation or by experiment. As the pair of cutting edges for the gear and pinion are tangent to each other at their intersection with the helical path of contact, matching pitch lines and matching profile inclinations are obtained regardless of curvature. An estimated ample relative curvature of the pair of cutting edges may be used to start with. The curvature of for instance the pinion cutting edge is then decreased until the running test shows a sufficient width of tooth bearing.

In all cases the gear and pinion are generally of opposite hand, as usual in hypoid gearing. Thus in Figures 1 and 2 the pitch lines 36 and 37 define a right-hand gear and a left-hand pinion.

While the invention has been described in connection with several different embodiments thereof, further modifications may be made without departing from its spirit. This application is intended to cover any variations, uses, or adaptations of the invention following, in general, the principles of the invention and including such departures from the present disclosure as come within the known or customary practice in the art to which the invention pertains and as may be applied to the essential features herein set forth and as fall within the scope of the invention or the limits of the appended claims.

I claim:
1. Hypoid gearing comprising a gear and a mating pinion having angularly disposed and offset axes, the teeth of said pinion being spirally arranged and adapted for successive engagement along their length, said teeth being disposed wholly on one side of the center line of the gear pair, the teeth of each member of the gear pair being curved lengthwise in such a way that opposite sides of the teeth have equally curved lengthwise profiles in a surface of revolution of distinctly curved axial profile, said surface being coaxial with the respective member and having a convex axial profile on the gear and a concave axial profile on the pinion.

2. Hypoid gearing according to claim 1, wherein the tooth tops of the gear have equally curved opposite intersection lines with a surface of revolution of convex axial profile, said surface of revolution being coaxial with the gear.

3. Hypoid gearing according to claim 1, wherein the tooth tops of the gear lie in a surface of revolution of convex axial profile, said surface being coaxial with the gear.

4. Hypoid gearing according to claim 1, wherein the gear and pinion have a path of contact inclined to the longitudinal direction of the teeth at a mean point thereof at an angle larger than the spiral angle of the pinion at this point, on each of the two sides of the teeth, said path lying in a surface of revolution that follows said teeth in the manner of a pitch surface.

5. Hypoid gearing according to claim 1, wherein the mean path of contact between the gear and pinion longitudinally of their teeth is a constant-lead helix about an axis intersecting the mean plane of rotation of the pinion at a point beyond its outside circle in said plane.

6. Hypoid gearing according to claim 5, wherein the axis of the helical mean path of contacts intersects the center line of the gear pair and approximately coincides with the axis of a basic helical member of the hypoid gear pair, the lead of said helical path being approximately equal to the lead of said basic helical member.

7. A hypoid gear having teeth curved lengthwise and extending between an outer end and an inner end of its face, the side surfaces of said teeth being warped surfaces whose profile inclination increases from said outer end to the inner end of the longitudinally convex side of the teeth and decreases from the outer end to the inner end on the longitudinally concave side of the teeth, said gear having a tooth depth at the middle of its face width larger than the average tooth depth at opposite ends.

8. A hypoid gear according to claim 7, wherein the gear has a maximum tooth depth in a zone between the opposite ends of its face.

9. A hypoid gear having teeth curved lengthwise and having longitudinally convex and concave tooth sides, the convex side of said teeth being distinctly more curved than the concave side in a conical section tangent to their lengthwise direction and coaxial with said gear.

10. A hypoid gear according to claim 9, wherein the tooth sides are warped surfaces whose profile inclination increases from the outer end to the inner end of the teeth on the longitudinally convex tooth sides and decreases from the outer end to the inner end of the teeth on the longitudinally concave tooth sides.

11. A hypoid gear according to claim 9, wherein each tooth side surface is a surface of constant profile extending about and at a constant distance from an axis, the side surfaces of a tooth space being coaxial surfaces whose axis passes between said tooth space and the axis of the hypoid gear.

12. Hypoid gearing according to claim 5, wherein the surface of action between mating tooth sides of the gear and pinion is a helical surface of constant lead, said surface being approximately coaxial with a basic helical member of the hypoid gear pair.

13. Hypoid gearing according to claim 12, wherein the profiles of the gear and pinion teeth are approximately complementary in a normal section adjacent the middle of the teeth.

14. Hypoid gearing according to claim 5, wherein the tooth surfaces of the gear and pinion are surfaces containing a constant profile and such as may be described on the rotating gear and pinion by a line moving helically about an axis in proportion to the rotation of the gear and pinion, approximately in the manner of a basic helical member of the gear pair.

15. Hypoid gearing according to claim 5, wherein the tooth surfaces of the gear and pinion are surfaces of constant profiles and such as may be described on the rotating gear and pinion by a line moving in a helical path across the tooth zone while said line is simultaneously turned about a point describing a helical path and lying adjacent said line, said line being different on the two members of the gear pair.

16. Hypoid gearing according to claim 15, wherein the describing line is turned about an axis parallel to the axis of the helical path, as it moves in a helical path across the tooth zone.

References Cited in the file of this patent

UNITED STATES PATENTS

| | | |
|---|---|---|
| 1,694,028 | Wildhaber | Dec. 4, 1928 |
| 1,826,852 | Wildhaber | Oct. 13, 1931 |